United States Patent [19]

Slaughter

[11] 4,136,231

[45] Jan. 23, 1979

[54] SANDWICH PANEL FABRICATION

[75] Inventor: Edward R. Slaughter, Palm Beach Gardens, Fla.

[73] Assignee: United Technologies Corporation, Hartford, Conn.

[21] Appl. No.: 751,556

[22] Filed: Dec. 17, 1976

Related U.S. Application Data

[62] Division of Ser. No. 640,807, Dec. 15, 1975, Pat. No. 4,020,542.

[51] Int. Cl.² ............................................. B32B 15/00
[52] U.S. Cl. ..................................... 428/609; 428/54; 428/660; 428/925; 428/614; 428/615
[58] Field of Search ................... 29/155 R, 423, 411, 29/417, 424, 457, 462, 485 LM; 428/615, 614, 573, 590, 544, 600, 609, 603, 598, 635, 660, 684, 925, 54

[56] References Cited

U.S. PATENT DOCUMENTS

| | | | |
|---|---|---|---|
| 3,044,160 | 7/1962 | Jaffee | 29/157.3 R |
| 3,061,713 | 10/1962 | Eggert, Jr. | 219/107 |
| 3,116,981 | 1/1964 | Sayre | 428/590 |
| 3,380,146 | 4/1968 | Babel et al. | 428/635 |
| 3,427,706 | 2/1969 | Jaffee | 428/594 |
| 3,533,153 | 10/1970 | Melill et al. | 228/182 |
| 3,667,107 | 6/1972 | Anderson, Jr. et al. | 228/182 |
| 3,849,079 | 11/1974 | Montuelle et al. | 428/635 |

*Primary Examiner*—Arthur J. Steiner
*Attorney, Agent, or Firm*—Charles A. Warren

[57] ABSTRACT

In the manufacture of sandwich panels, a filler assembly is made up of rib elements and core elements that are roll bonded into a unitary structure, and slices are then cut from the unitary structure forming filler assemblies to be positioned between surface sheets. The surface sheets and the filler assemblies are then bonded together to form the panel.

4 Claims, 7 Drawing Figures

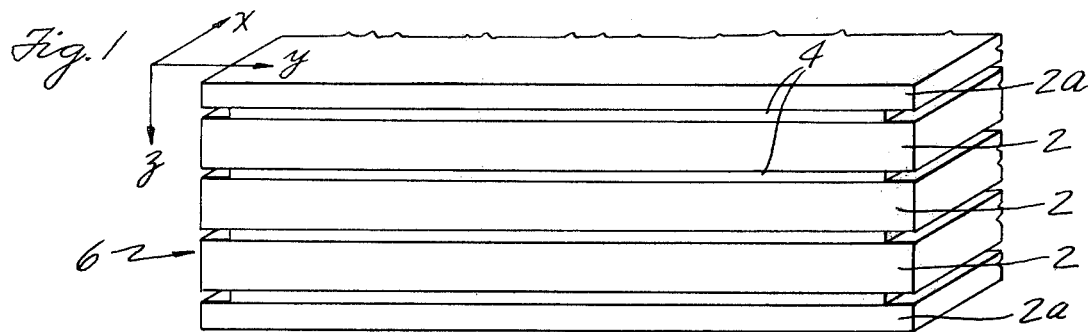
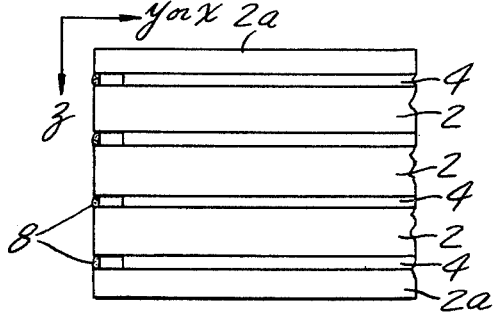
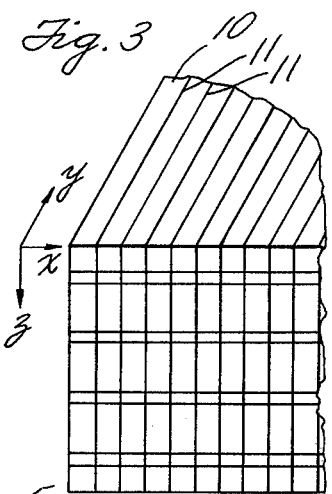
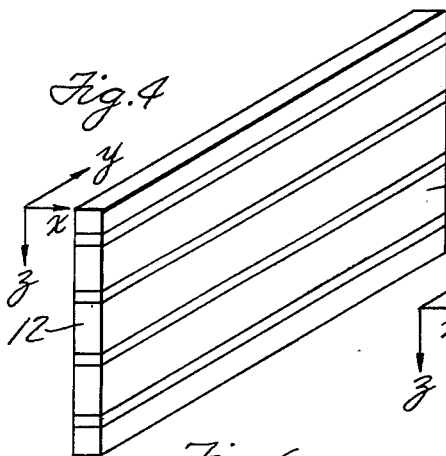
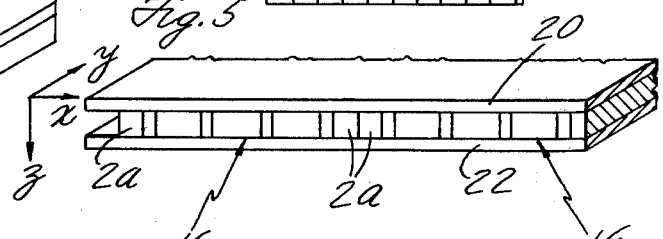
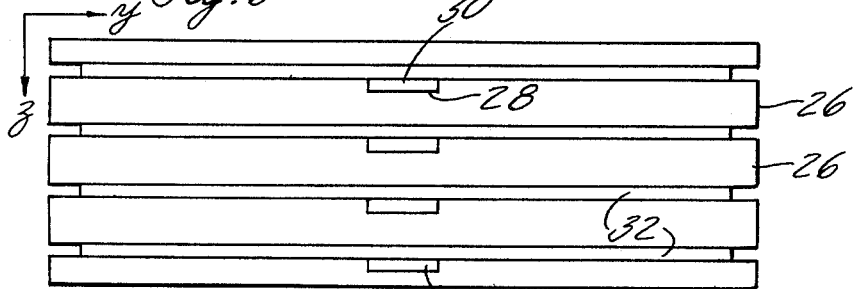
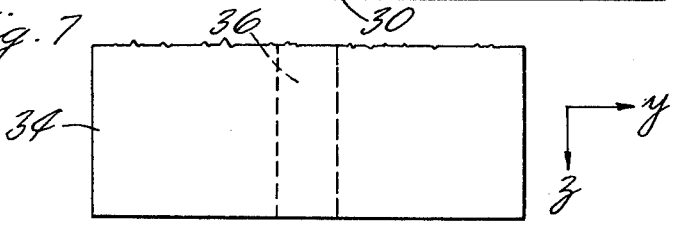

SANDWICH PANEL FABRICATION

This is a division of application Ser. No. 640,807 filed Dec. 15, 1975, now U.S. Pat. No. 4,020,542.

SUMMARY OF THE INVENTION

When a sandwich panel is built up of surface sheets with separate rib elements and core elements therebetween, the elements must all be precisely dimensioned to assure a proper fit between the cover sheets and the ribs and core elements so that all the elements are in contact with both cover sheets to be bonded thereto. Further the large number of individual core elements and rib elements makes for a difficult positioning of all the elements in the proper relation in an assembly of the parts in readiness for bonding.

A feature of the present invention is a filler assembly made up of interleaved rib elements and core elements all bonded together into a single assembly that will replace several of the individual core and rib elements. A further feature is the assembly of relatively large sheets of rib material and core material in stacked relation and bonded together into a unitary structure with each filler assembly being sliced from the unitary structure by cutting the unitary structure at right angles to the plane of the assembled sheets. This assures an assembly of uniform thickness with rib elements in proper relation to one another in the filler assembly.

The foregoing and other objects, features, and advantages of the present invention will become more apparent in the light of the following detailed description of preferred embodiments thereof as illustrated in the accompanying drawing.

BRIEF DESCRIPTION OF THE DRAWING

FIG. 1 is a side elevation of the original stack for making the filler assembly.

FIG. 2 is a fragmentary sectional view showing a step in forming the unitary structure.

FIG. 3 is a fragmentary perspective view through the completed unitary structure showing how a filler assemblage is cut therefrom.

FIG. 4 is a perspective view of a filler assembly.

FIG. 5 is a sectional view through a panel build up using filler assemblages.

FIG. 6 is a view similar to FIG. 1 of a modification.

FIG. 7 is a fragmentary view of a panel made using filler assemblies made from the stack of FIG. 6.

DESCRIPTION OF THE PREFERRED EMBODIMENT

The purpose of the invention is to make filler assemblages all of uniform characteristic dimensions for positioning between the surface sheets of a sandwich panel in building up a complete panel in which the ribs will all be precisely spaced and securely bonded to the surface sheets. To accomplish this, a plurality of sheets of rib material and of core material are assembled in a stack and bonded together and the filler assemblies for the panel are sliced from this complete stack.

As shown in FIG. 1 a plurality of sheets 2 of core material are stacked alternately with or interleaved with sheets 4 of rib material to form the stack 6. Desirably the top and bottom sheets 2a are core material for reasons that will become apparent. These top and bottom sheets 2a are also preferably thinner than the other core sheets for reasons that will appear. The core sheets are preferably larger in both directions than the rib sheets as shown in FIG. 1.

When the stack is completed the core sheets are welded together along all four sides by welds 8, FIG. 2, to form a unit. The spaces between the adjacent core sheets are then evacuated to prevent oxidation during subsequent heating for bonding. The procedure for such evacuation is old and well known and need not be described.

The assembled unit is then heated to a suitable temperature for bonding the sheets together. A preferred method of bonding is by roll bonding in which a reduction in thickness is also obtained.

In order to make the invention more easily understood, a set of three mutually perpendicular axes, x y and z, are arbitrarily defined in FIG. 1 to be used in describing this and subsequent operations. Axis x is the rolling direction during roll bonding of the unitary structure, axis y is the direction in the rolling plane transverse to the rolling direction and axis z is the direction in which a reduction in thickness is effected during the roll bonding operation. Where, for example, the rib material is titanium and the core material is a carbon steel, the roll bonding temperature may be around 1500° F. and the reduction may be about 2.5 to 1. The starting thickness of the sheets is selected so that the finished thickness of the rib sheets in the bonded unit will correspond closely to the desired rib thickness in the panel and the core sheet thickness will correspond closely to the desired rib spacing in the finished sandwich panel.

After the roll bonding and thickness reduction is accomplished, the peripheral edges of the unit are removed as shown in FIG. 3 to expose the rib sheets, and the top and bottom sheets of the unit are ground to produce flat and parallel top and bottom surfaces and a precise overall dimension for the unit and to provide a total thickness of the top and bottom core sheets equal to the thickness of each of the other core sheets. Since the top and bottom sheets are core material, the thickness of a rib is not affected by this grinding operation.

Filler assemblies are then cut from the unit as by milling or sawing slices 10 from the unit stack as by saw cuts 11. These slices 10 are at right angles to the plane of the sheets as shown in FIG. 3 and these slices extend the full width of the unit stack. The dimension of these slices along the x axis, which slices become filler assemblies in the production of the panel, is such that they will produce the desired thickness of ribs in the finished panel and this necessary thickness will be determined as pointed out later.

Each individual slice 10 in being prepared for use as a filler assembly as shown in FIG. 4 has the cut surfaces, the opposed side surfaces 12 and 14, carefully ground or etched so that these opposite surfaces are precisely parallel and the desired dimensions along the x axis are obtained, the grinding or etching being such that the edges of the rib elements are sharp 90° corners to assure complete surface contact with the surface sheets of the panel. The completed slice is now ready for use as shown in FIG. 4 and in this configuration is one of several filler assemblies 16 to be used in making the panel. It may be desirable to selectively etch each filler assembly so that the rib elements project beyond the surfaces of the core elements by a small amount, for example 0.002-0.005 inch although this is not always necessary.

Each filler assembly is a unit in itself, as shown in FIG. 4 and consists of spaced rib elements 4 and core element 2 interleaved with or alternating with the rib elements and holding the rib elements in the desired rib spacing of the finished sandwich panel. The core elements, since they fill the space between the rib elements and are bonded thereto correspond to the desired rib spacing in the finished panel. The end core elements 2a of adjacent panels total in thickness to the spacing between adjacent rib elements in the finished panel, as shown in FIG. 5, to assure a uniform spacing of all the rib elements.

The filler assemblies 16 are then ready for assembly between the surface sheets of the panel. As shown in FIG. 5, the surface sheets 20 and 22 of the panel have positioned between them a plurality of filler assemblies in side by side relation with the rib elements of all the assemblies necessarily in parallel relation to one another and at right angles to the surface sheets. By having the thickness of both the top and bottom core elements together equal to the thickness of the intervening core elements and by placing adjacent filler assemblies in contact, the adjacent rib elements in contiguous filler assemblies will have the same spacing as the rib elements within each assembly.

It will be obvious that a build up of panel elements is greatly facilitated by these filler assemblies. Instead of individual rib elements and core elements, each separately positioned on one surface sheet, these filler assemblies significantly reduce the number of individual pieces to be handled and each filler assembly serves to hold the several elements therein in proper relation to one another.

Further, since there are fewer pieces to be assembled into a panel, there is much less problem in maintaining the desired dimensional control. Clearly it is easier to maintain the desired dimension of the filler assembly as one piece within the desired tolerances than to maintain the desired cumulative dimension of the several individual rib and core elements that are superseded by each filler assembly. Also, the uniformity of dimension x is easily maintained. Thus, a uniform packing of all the filler assemblies used in making each panel is readily obtained. It is well known that uniform packing is necessary to assure adequate bonding of the surface sheets to the rib elements over the entire contacting surfaces during roll bonding.

Once the panel structure is assembled as shown it is bonded into a unitary structure by well known techniques. For example, the panel structure may be placed in a jacket of mild steel and after the assembly is evacuated, roll bonded at 1700° F. with about a 3 to 1 reduction. The rolling direction for the bonding of the ribs and surface sheets is in the y direction. Other forms of bonding may be used.

The panel structure after being bonded and rolled to the desired thickness is made ready for use by leaching out the core material as by a nitric acid bath which will remove the core without attacking the rib or surface sheet material. The cover sheets of mild steel are also removed, either by leaching or by peeling before this core is leached. Since a carbide layer forms between the cover sheets and the surface sheets of the panel, the bond between them is brittle and permits easy mechanical removal of the cover sheets.

This concept of making up filler assemblies for a panel structure also permits localized strengthening of the ribs of a panel. Thus, instead of a stack made as in FIG. 1, all or some of the core sheets 26, FIG. 6, may have grooves 28 formed therein to receive a mating strip of rib material 30 in a position to contact with and be bonded to the adjacent rib sheet 32.

A stack of this type is made into a molded up structure as in FIG. 2 which is heated and then bonded into a unitary stack as by roll bonding as above described. Filler assemblies are then cut from the unitary stack and ground or otherwise finished so that opposed surfaces are flat and square. Each filler assembly will have a section in which the rib elements are locally reinforced, the material 30 having been integrally bonded to the rib sheets. If the panel structure is then built up with these filler assemblies as before, the completed panel 34, FIG. 7, will have a section 36 represented by the dash lines in which the ribs are thicker than in the remainder of the panel. Obviously, if it is desirable to have the reinforced portion parallel to the y dimension of the panel, the filler assemblies in the reinforced region will be made from a unitary structure containing thicker rib sheets.

It is well known that as roll bonding is accomplished, reductions in thickness are accompanied by essentially corresponding increases in dimensions in the rolling direction. Transverse dimensions are essentially unchanged. The dimensions of the filler assemblies, rib and core material sheets and the location and size of reinforcing strip 30 are chosen to accommodate these effects.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of my invention, that which I claim as new and desire to secure by Letters Patent of the United States is:

1. A filler assembly for a sandwich panel consisting of a plurality of rib elements interleaved with core elements positioned to hold the rib elements in spaced relation and all bonded together into a unitary structure and with core elements forming the outer elements of the filler assembly, said filler assembly having all rib elements of a uniform thickness and all core elements of a uniform thickness.

2. A filler assembly as in claim 1 in which both edge elements are core elements and both these edge elements together correspond in width to the interleaved core elements.

3. A filler assembly as in claim 1 in which the core elements are all uniformly thinner than the rib elements so that the rib elements project beyond the core elements on opposite sides of the assembly.

4. A filler assembly as in claim 1 in which a portion of each rib element is thicker than the remainder thereof to produce a reinforced part in the panel.

* * * * *